United States Patent Office 2,723,962
Patented Nov. 15, 1955

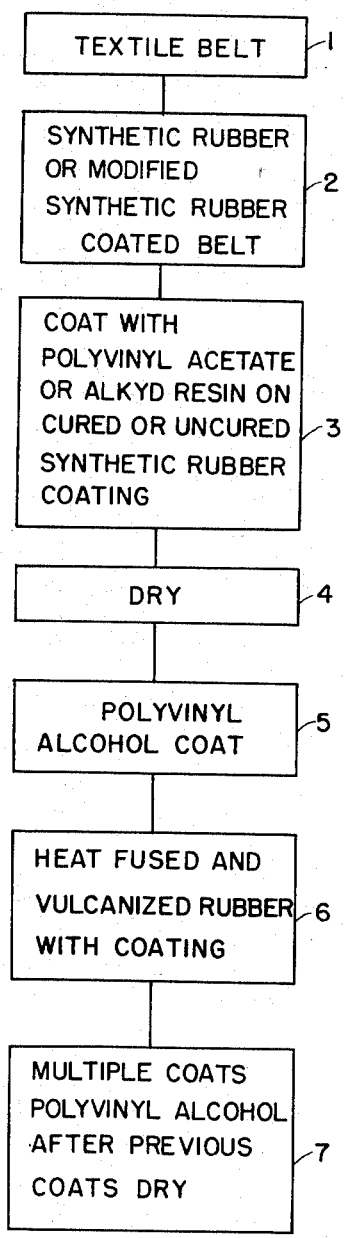
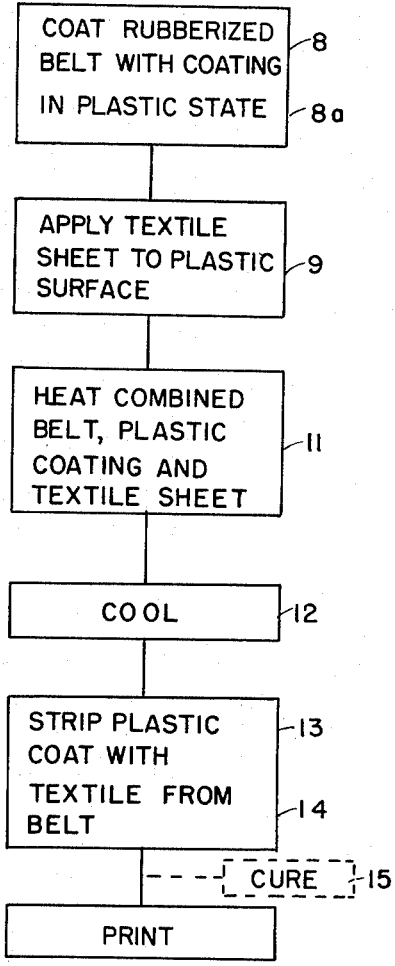

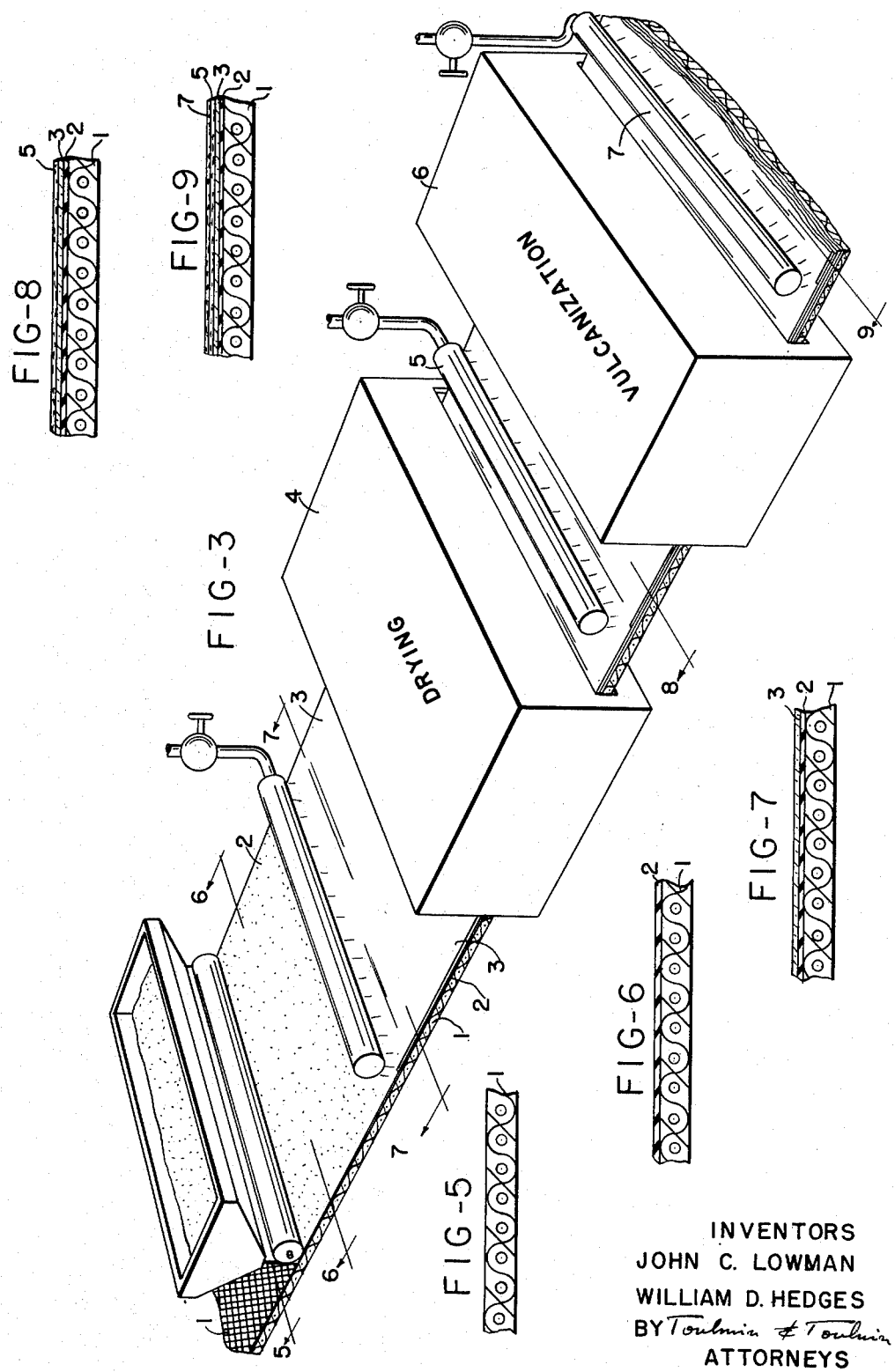

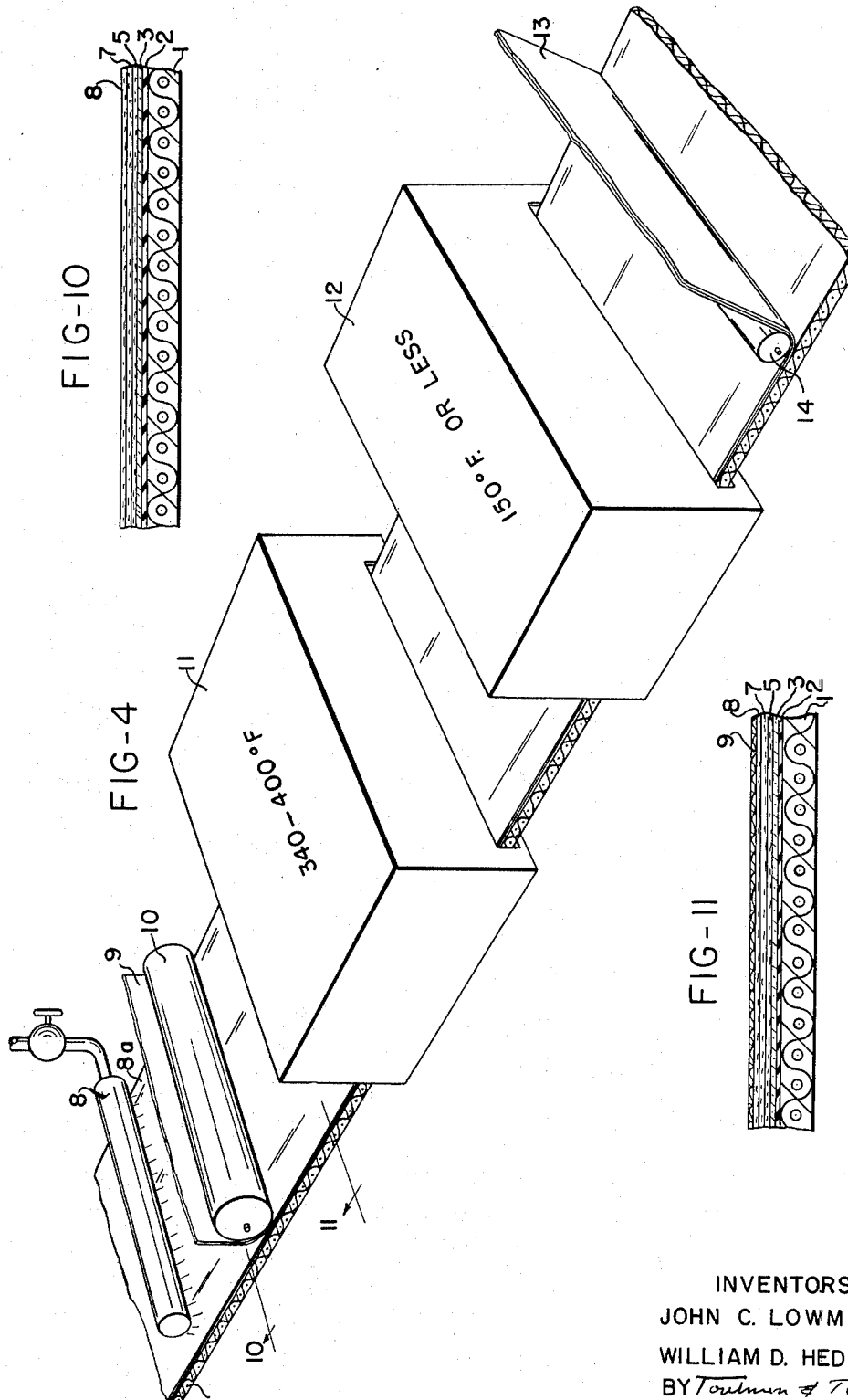

2,723,962

METHOD AND APPARATUS FOR CASING VINYL FILM CONTINUOUSLY

William D. Hedges and John C. Lowman, Franklin County, Ohio, assignors to Columbus Coated Fabrics Corporation, Columbus, Ohio, a corporation of Ohio Original application November 5, 1951, Serial No. 254,926, now Patent No. 2,704,735, dated March 22, 1955. Divided and this application July 1, 1952, Serial No. 297,842

1 Claim. (Cl. 260—22)

This invention relates to resinous compositions and is a division of our co-pending application, Serial No. 254,926, filed November 5, 1951, and assigned to Columbus Coated Fabrics Corporation, an Ohio corporation, of Columbus, Ohio. The coating compositions with which this invention is concerned are particularly resinous compositions for the casting of resinous films either to form a film alone, or to form a film fastened to a support such as of textile material.

Heretofore, in the particular art with which this invention is concerned, great difficulty has been experienced in the forming of proper sorts of films, and in the stripping of these films from the surface of a conveying carrier. A particular object of the present invention, therefore, is the provision of a resinous composition particularly adapted for being cast on a smooth carrier surface and and characterized in that it can be readily stripped therefrom either in a supported or unsupported state.

It is a further object to provide a composition for the film coating that will be non-adherent or slightly non-adherent to the supported resin.

It is an object to provide a composition of the resin itself of such character, that it can be applied in a liquid or viscous state and can be caused to adhere to a textile support and after so adhering can be stripped from its supporting belt, and thereafter fused.

It is an object to provide a composition of a resin for such coating purposes which can be cast on the belt, be stripped from the belt, which will not adhere to the belt, but which will adhere to a carrier for removing it from the belt, such as a textile carrier and the like.

It is an object to provide such a coating in a paste or suspension form so that it can be cast, spread, rolled or otherwise coated upon the surface of the belt.

Referring to the drawings:

Figure 1 is a flow sheet showing the steps in the process of preparing the surface of a belt or carrier for receiving a film of the material of my invention, by coating with synthetic rubber or modified synthetic rubber.

Figure 2 is a flow sheet illustrating the steps in applying the resin coating to the belt, in treating it while on the belt, and removing it from the belt.

Figure 3 is a diagrammatic flow sheet illustrating the mechanism in diagrammatic form for the coating of the belt, the vulcanization of the coating, the top coating of the belt, the coating of the belt with resin, and the application of a textile carrier to the resin coating on the belt and its removal with the resin coating.

Figure 4 is a top plan isometric view showing in perspective the end of the treatment apparatus on which the vinyl paste is applied and to which the textile sheet is applied for stripping.

Figure 5 is a section on the line 5—5 looking in the direction of the arrows on Figure 3.

Figure 6 is a section on the line 6—6 looking in the direction of the arrows on Figure 3.

Figure 7 is a section on the line 7—7 of Figure 3 looking in the direction of the arrows.

Figure 8 is a section on the line 8—8 of Figure 3 looking in the direction of the arrows.

Figure 9 is a section on the line 9—9 of Figure 3 looking in the direction of the arrows.

Figure 10 is a section on the line 10—10 of Figure 4 looking in the direction of the arrows.

Figure 11 is a section on the line 11—11 looking in the direction of the arrows on Figure 4.

Referring to the figures, 1 is a textile material which is to be coated with rubber or synthetic rubber coating 2 and on top of this coating has been placed the polyvinyl coating 3. Then the belt is dried at 4 and additional polyvinyl coatings have been applied at 5. Thence the rubber coated belt is vulcanized at 6 and then passes under additional polyvinyl alcohol sprays 7. Then the composite belt proceeds beneath the applicator 8 which may use spray, spreader, roller coater or the like, for the application for the vinyl paste designated 8a. While this is in paste form the textile sheet 9 is brought into engagement with it by the roller 10. The composite structure of the supporting belt, paste and textile sheet is passed through the heater 11, and thence through the cooler 12 to the point where the textile sheet 13, with the vinyl coating (which is now hard) is removed from the belt carrier as indicated over the roller 14. If desired this sheet 13 can be heat fused at 400° F., see step 15. Thereafter, the sheet can be printed.

Referring to the drawings, the following are the various steps and the processes of forming a carrier service, applying the resin to the surface and removing the resin from the surface.

BELT CARRIER FORMATION

Any suitable textile material such as twill, duck or sheeting is utilized for the underlying conveyor or belt. There is first calendered or coated into the surface of this belt a rubber coating of butyl, GRS or other natural or synthetic rubber coating.

The second step is to coat rubberized surface with polyvinyl acetate plasticized with an alkyd resin. Thereafter, the coating is dried and another coat of polyvinyl alcohol is applied. The composition belt is then heat fused and vulcanized so that the rubber and the coatings art both fused together at a temperature of about 275° F. It is understood that the rubber or synthetic coating is compounded in the usual manner.

After the heat fusing and vulcanization, multiple coats of polyvinyl alcohol may be applied and then dried. The belt is now ready for the application of its temporary resin coating for the casting and subsequent stripping of that coating.

The belt is coated with a vinyl resin, preferably in a liquid paste form. That is, the belt is pliable and has a smooth base, will stand a temperature of from 350° to 400° F. with alternate cycling of cooling and heating; as set forth hereinafter, it forms a permanent support for this paste. Resin paste is composed of the following as set forth in the subsequent examples:

Example 1

The following is a formula used in a typical textile paste:

| | Parts |
|---|---|
| A copolymer of vinyl acetate and vinyl chloride | 10 |
| A pigment, such as titanium dioxide | 3 |
| A filler, such as claiy | 4 |
| A plasticizer of an alkyd type | 2 |
| Dioctyl phthalate | 4 |
| A secondary plasticizer such as tetrahydrofurfuryl-oleate | .2 |
| A heat stabilizer such as dibasic lead stearate | .3 |
| A releasing agent, such as paraffin, wax, etc. | .1 |

The dioctyl phthalate is a primary plasticizer and gives cohesion to the coating mixture as well as giving pliability and continuity of the fused film resulting from such a resin paste. The alkyd type resin is a linear condensation polymer, e. g., a polyester of 1,2 propylene glycol and sebacic acid and having a molecular weight of about 6000. A suitable plasticizing resin of this type is described in U. S. Patent 2,071,215. Such a plasticizing alkyd resin of this character is marketed as Paraplex G40 by Rohm and Haas and is useful for imparting certain flow properties to the paste as well as definite desirable properties in the finished fused film. The tetrahydrofurfuryloleate or fatty acid type plasticizer is known as a secondary plasticizer and is used to impart proper film and drape in the film.

The foregoing composition is mixed in one operation at room temperature.

*Example II*

|  | Parts |
|---|---|
| Vinyl resin | 10 |
| Pigment | 3 |
| Filler | 4 |
| Methylacetyl ricinoleate | 2 |
| Dioctyl phthalate | 4 |
| Dibasic lead carbonate | 0.3 |
| Paraffin | 0.1 |

*Example III*

|  | Parts |
|---|---|
| Vinyl resin (copolymer) | 10 |
| Glyptal resin (glycerol-phthalic acid polymer) | 3 |
| Dioctyl phthalate | 2 |
| Dibasic lead stearate | 3 |
| Paraffin | 0.1 |
| Naphtha | 1.5 |

After one of the foregoing resinous coatings is applied in paste form to the surface of the belt, it is preferred to apply a textile supporting sheet as illustrated in Figure 4, or otherwise, which is brought in contact with the surface of the paste and pressed into engagement with the paste so that the paste impregnates and coats one side of the textile materials. Thereafter, the combination of the supporting belt, the plastic coating and the textile sheet is subjected to a temperature of up to 400° F. Then the combined product of the belt, plastic coating, and textile sheet are cooled down to 150° F. or below. Thereafter, the textile impregnated sheet is stripped from the belt and removes with it the plastic coat. The textile treated sheet is then ready for fusing, if necessary, or suitable decorative printing, or both. The successive steps are shown in Figure 2 and in Figure 4 of the drawings forming a part of this invention.

Optionally, the resinous coating can be heat treated and hardened prior to the application of the textile sheet, printed open and then reheated in engagement with the textile sheet to impregnate the sheet with the printed resinous film.

It will then be understood that in the normal method when the fabric is applied to the vinyl coating, the latter is a paste with no strength. In this stage the textile material is pressed into the paste and thereafter, the subsequent steps of heating, chilling and stripping take place. It is also optional to heat the vinyl until it becomes sticky and adhesive and then to apply to the textile material.

It is important that the polyvinyl chloride, or a copolymer of polyvinyl chloride and polyvinyl acetate, or a copolymer of polyvinyl chloride and vinylidene chloride be so produced that the particle size of the resins will wet out with the minimum of plasticizer or any other liquid so as to produce a paste or suspension of ingredients that can be cast, spread, or roller coated. It is my object to provide a resin surface suitable for preventing excessive absorption of the liquid phase of the paste so that these liquids may be used as a carrying medium for the ingredients of the composition. It is these liquids that provide the paste's tacky surface.

After the resinous coating is removed by stripping the textile material from the belt, the belt is available for subsequent similar treatments of a paste resin and stripping. It has been found that a belt of this invention provides a smooth surface that resists scratching, that can be used a number of times and that is relatively cheap and flexible and can be handled because of its minimum weight without difficulty. The resinous coating is readily strippable from it without damage to the supporting belt.

It is to be understood that there are a variety of ways of applying these coatings by doctor blade, roller coating, a spreading knife, spray and the like. The belt is capable of repeated heatings to 350° to 400° F. to fuse the resin after it has been deposited upon the casting belt or sheet.

It will be further understood that there are various types of resinous products that may be made into a vinyl coating mixture known as organosols, plastisols or paste dispersions. Our basic objective is to provide a continuous film from this type of coating mixture. No satisfactory casting surface has been developed so far as I know, prior to the invention described herein. The initial cost of metal belts is very high as they are usually made of stainless steel and they are also subject to the difficulty of warping, twisting and rippling on the edges making it difficult to provide a smooth and uniform surface for casting purposes. The alternate changes in temperature further change the expansion of the stainless steel belt which causes a physical change in the regularity of its surface. To the contrary, my belt is flexible in its use, durable, relatively inexpensive and provides a surface for a satisfactory cast film. Underlying material may consist of any suitable fabric coated to the desired thickness with synthetic rubbers such as GRS, butyl, neoprene, Buna N, natural rubbers or combinations of the foregoing and rubber substitutes. We have found that a coating of an organosol, plastisol, or paste dispersion daub, when applied to such a surface as developed from the foregoing process and compounds and properly fused will not strip from a surface unless that surface is treated as heretofore described. We have found polyvinyl alcohol to be one of the most satisfactory surface treating agents for stripping vinyl coating. Polyvinyl alcohol, however, will not, in itself, adhere to rubber surfaces. We have found it, therefore, necessary to discover some combining agent by which the polyvinyl alcohol could be made to adhere to uncured rubber. We have found that, if a coating consisting of an emulsion of polyvinyl acetate and plasticized with an alkyd resin is first applied to the uncured rubber coating and, after drying, a coat of polyvinyl alcohol can be applied and then the treated fabric of the belt can be fused. Fusing time and temperature depends, of course, on the type of the synthetic rubber used as the base coating and upon the desired hardness or stiffness of the coated fabric desired. After the material has thus been fused, additional coats of polyvinyl alcohol are applied until the desired smoothness is obtained. This coated fabric becomes a satisfactory casting surface and may be used a number of times until marring of the surface takes place, but, in such an event, it is only necessary to refinish the casting surface of the coated fabric by additional coats of polyvinyl alcohol. It will be understood that it makes no difference whether the belt surface consists of a continuous belt or a long piece.

It is our object to not only produce independent film by this procedure but, also, produce fabric laminated to the film.

We produce both an unsupported cast film or a textile laminated cast film by our process and by my belt.

It will be understood that we desire to comprehend within our invention various adaptations and changes both mechanically and chemically which may be necessary to adapt it to varying conditions of use and types of materials. These variations and changes it is desired

We claim:

A textile sheet impregnated with a plastic composition which consists in the following constituent parts by weight:

| | Parts |
|---|---|
| A copolymer of vinyl acetate and vinyl chloride | 10 |
| Titanium dioxide | 3 |
| Powdered clay | 4 |
| A linear polyester of 1,2 propylene glycol and sebacic acid having a molecular weight of about 6000 | 2 |
| Dioctyl phthalate | 4 |
| Tetrahydrofurfuryloleate | 0.2 |
| Dibasic lead stearate | 0.3 |
| Paraffin wax | 0.1 |

References Cited in the file of this patent

UNITED STATES PATENTS

| | | |
|---|---|---|
| 2,275,957 | Groff | Mar. 10, 1942 |
| 2,431,078 | Powell et al. | Nov. 18, 1947 |
| 2,468,165 | Brister et al. | Apr. 26, 1949 |
| 2,528,507 | Foye | Nov. 7, 1950 |

OTHER REFERENCES

Rubber Age, vol. 67, No. 5, August 1950, pages 553–560.

Zimmerman et al., Rubber Age, vol. 68, No. 3, December 1950, pages 311–318.